Oct. 20, 1931.  C. WAGNER ET AL  1,828,516
DRYING APPARATUS FOR PLATES OF METAL AND OTHER MATERIAL
Original Filed Sept. 14, 1925   6 Sheets-Sheet 3
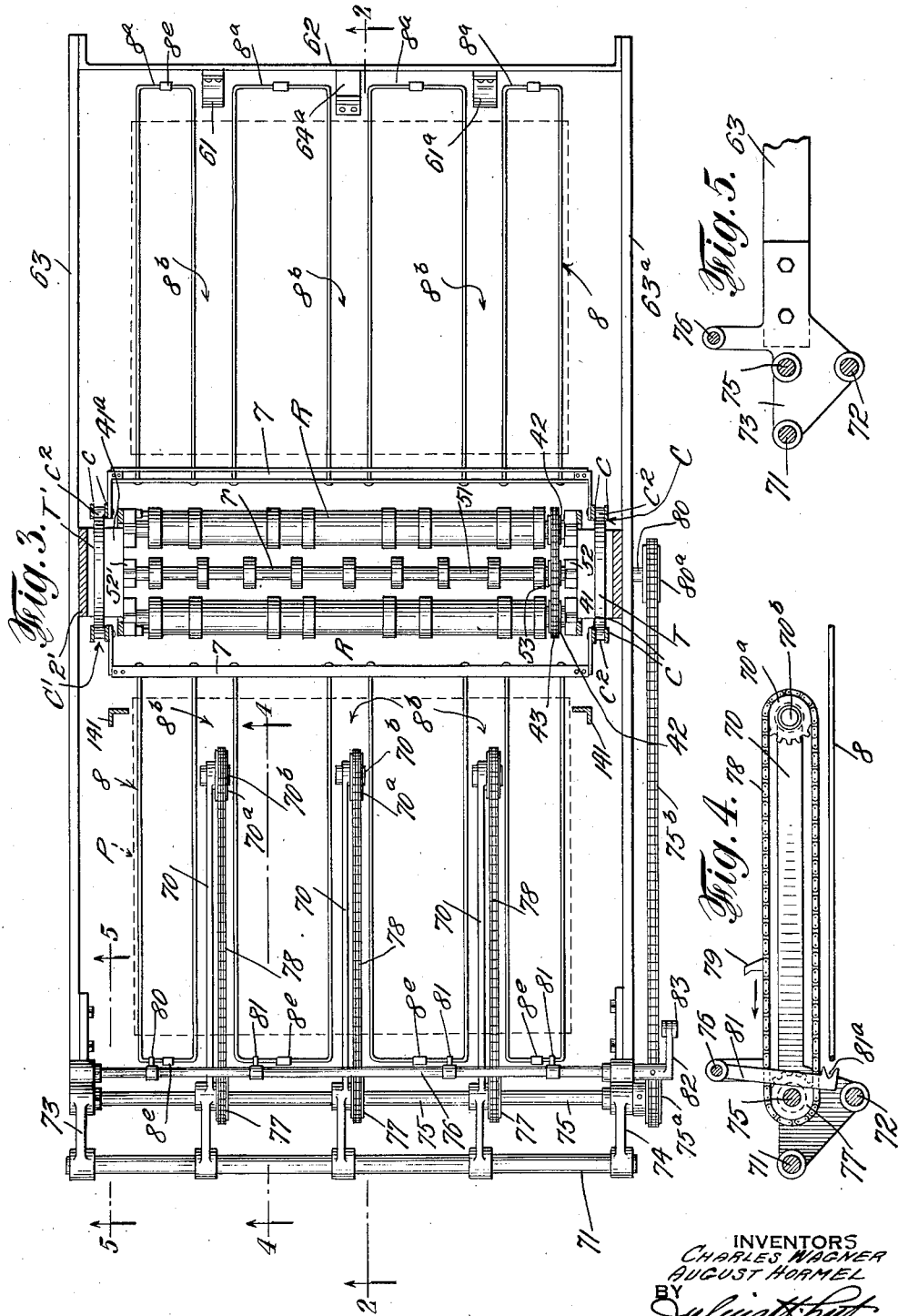
INVENTORS
CHARLES WAGNER
AUGUST HORMEL
BY
ATTORNEY

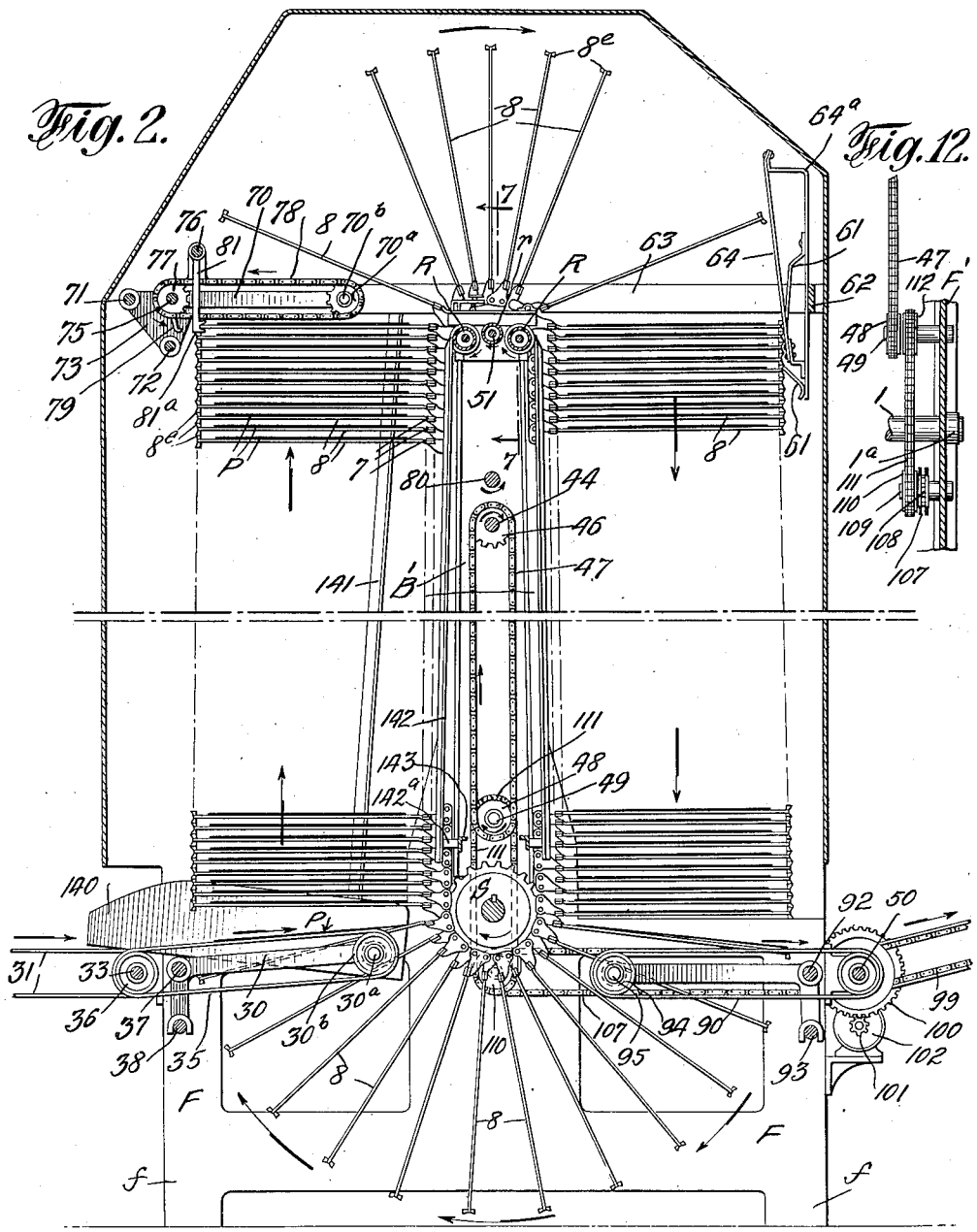

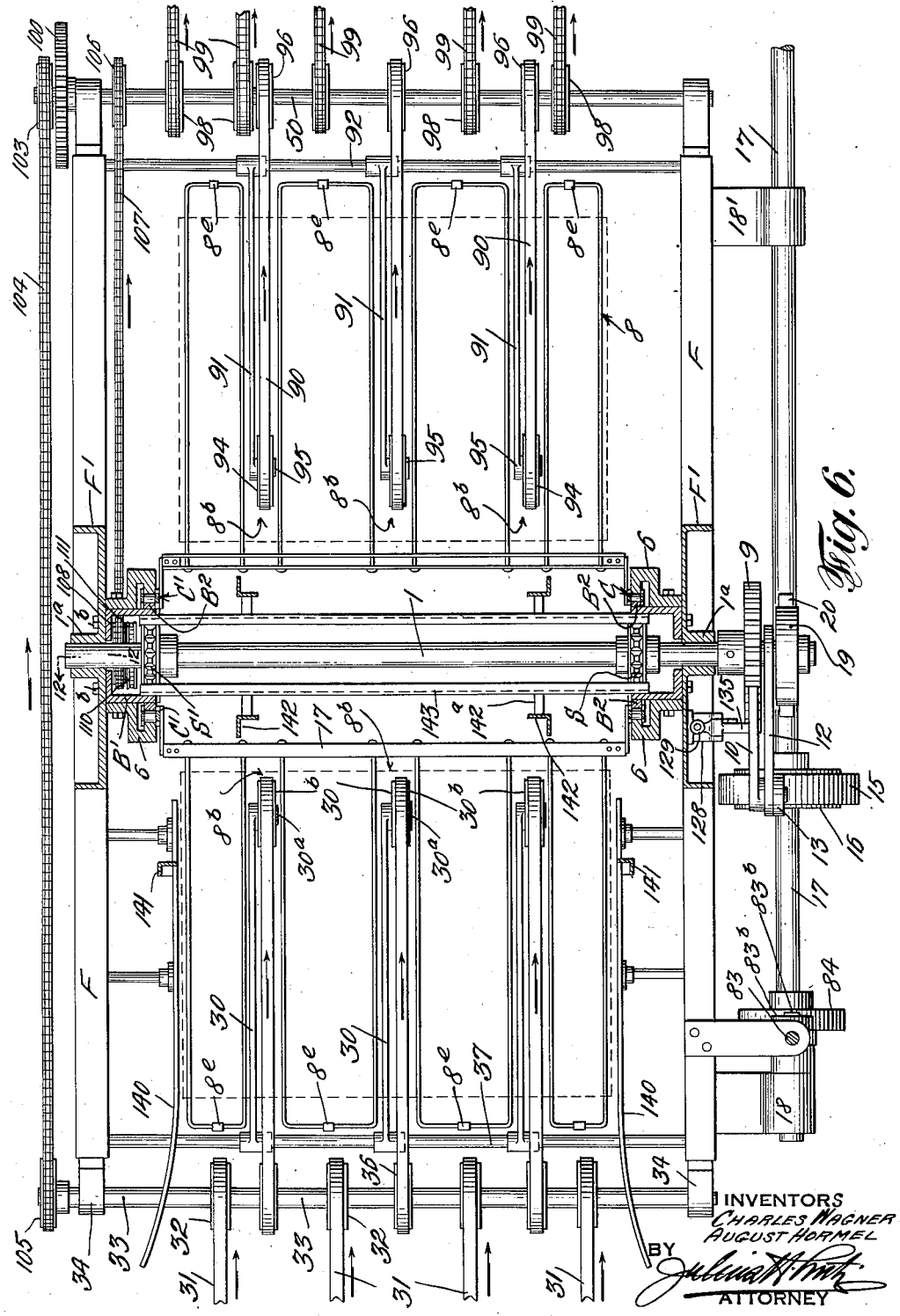

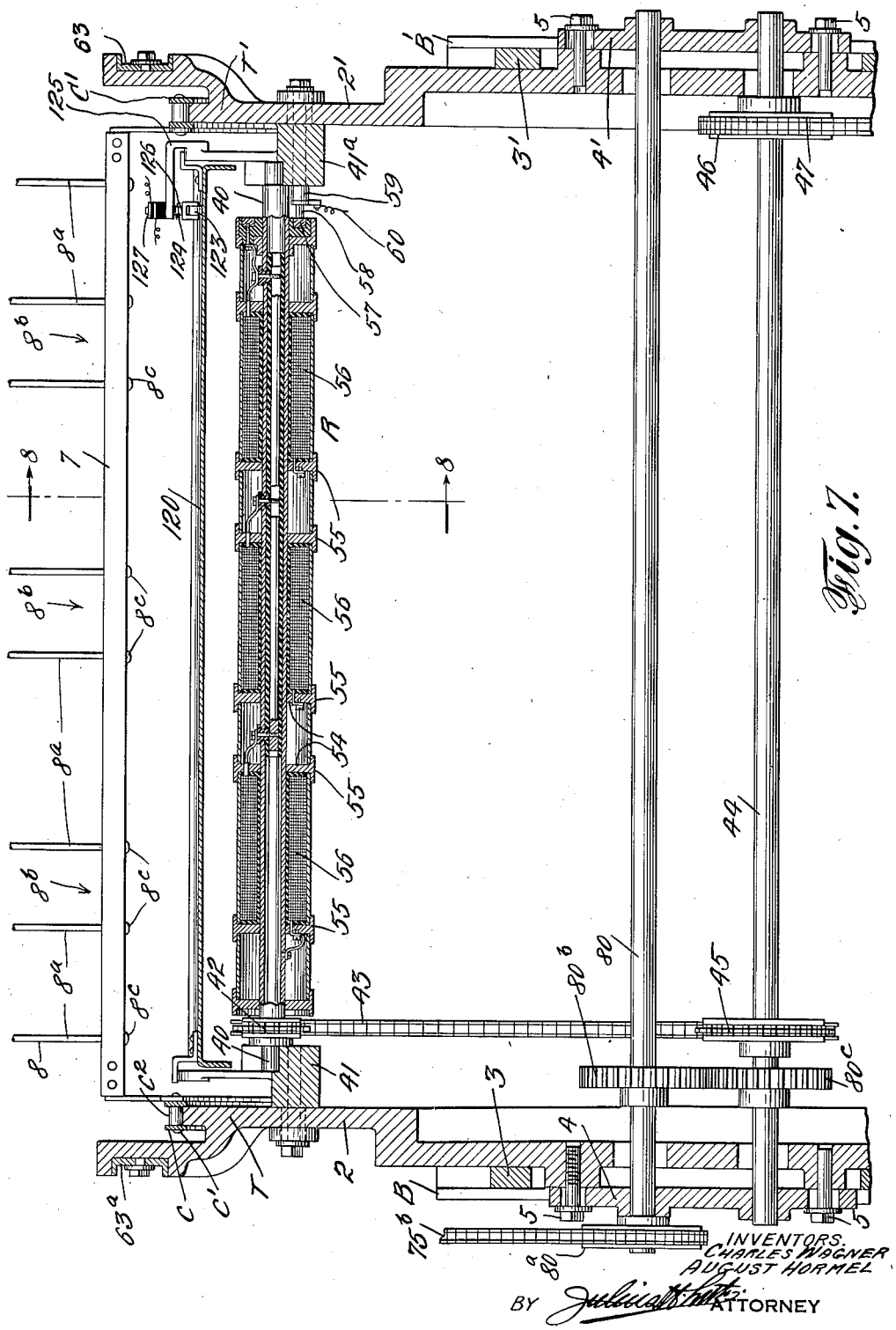

Oct. 20, 1931.   C. WAGNER ET AL   1,828,516
DRYING APPARATUS FOR PLATES OF METAL AND OTHER MATERIAL
Original Filed Sept. 14, 1925   6 Sheets—Sheet 6
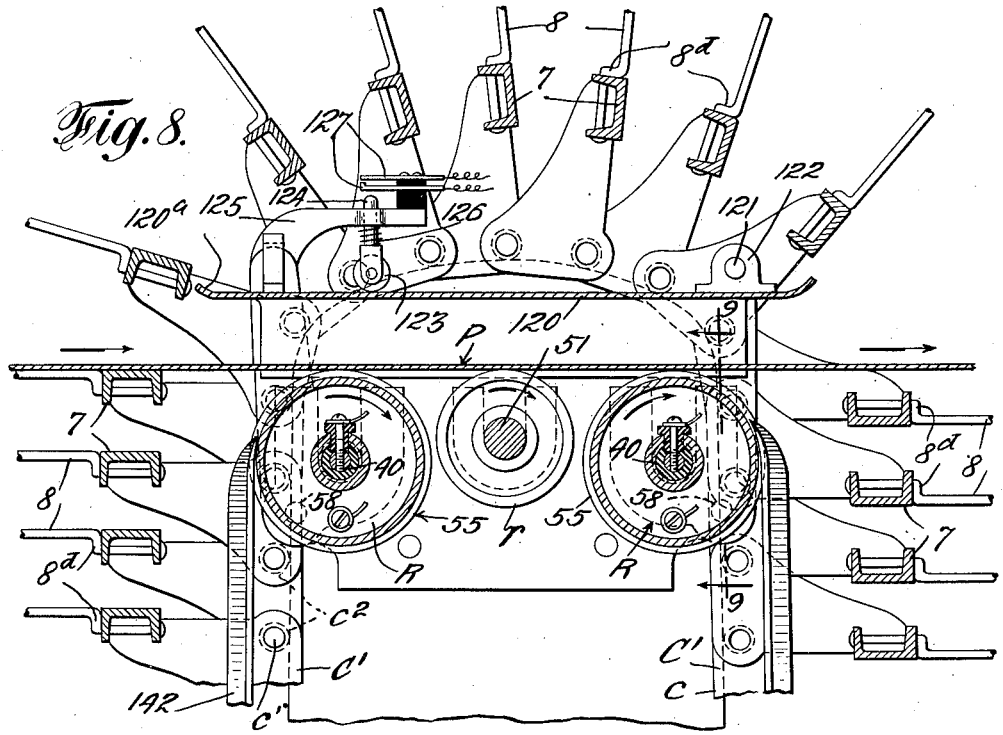
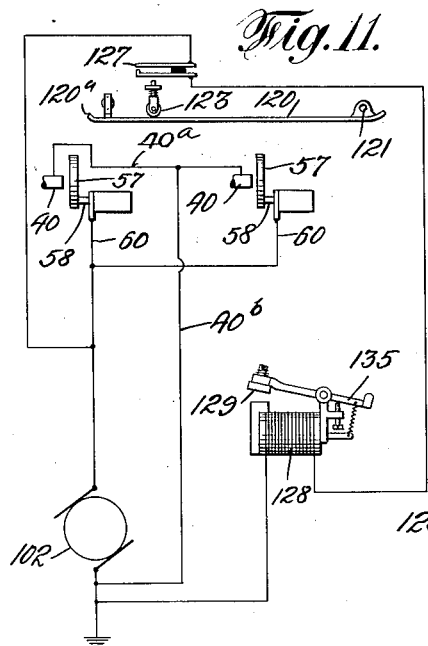
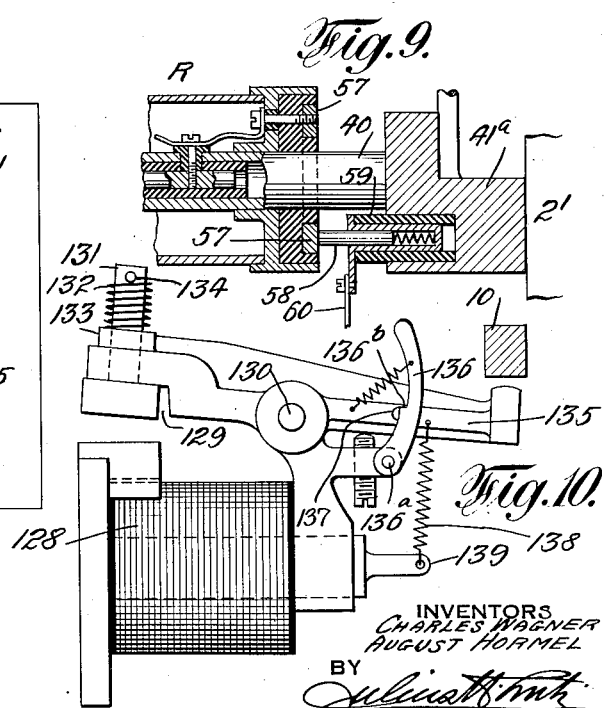
INVENTORS
CHARLES WAGNER
AUGUST HORMEL
BY
ATTORNEY Patented Oct. 20, 1931

1,828,516

UNITED STATES PATENT OFFICE

CHARLES WAGNER, OF GRANTWOOD, AND AUGUST HORMEL, OF JERSEY CITY, NEW JERSEY, ASSIGNORS TO CHARLES WAGNER LITHO. MACHINERY COMPANY, INC., A CORPORATION OF NEW YORK

DRYING APPARATUS FOR PLATES OF METAL AND OTHER MATERIAL

Original application filed September 14, 1925, Serial No. 56,120. Divided and this application filed August 1, 1929. Serial No. 382,691.

This invention relates to improvements in drying apparatus for plates of metal and other material.

This application is a division of an application filed by applicants September 14, 1925, and bearing the Serial No. 56,120.

One of the objects of our invention is to provide an efficient transfer mechanism for wet plates which are elevated in horizontal position with a wet face uppermost so as to enable the same to be shifted to descend also in horizontal position with the same face uppermost, whereby drying of the uppermost face may be accomplished during the elevation and descent of the plates without any danger of "running" of the coating material in one direction, and to utilize in the transfer of such plates a novel means which will enable shifting by engagement with the bottom surface thereof.

Another object of our invention comprises the use in the handling of plates and the like of a roller having peripheral attracting means arranged to move or shift a plate upon rotation of the roller.

Still another object of our invention is the use of electro-magnetic rollers for shifting the wet plates laterally from ascending to descending carriers.

Still another object of the invention is to provide means for automatically stopping the machine in the event of the fouling movement of a plate and we preferably provide electro-magnetic means for accomplishing this result.

With these and other objects in view, the invention comprises the combination of members and arrangement of parts so combined as to co-act and cooperate with each other in the performance of the functions and the accomplishment of the results herein contemplated, and comprises in one of its adaptations the species or preferred form illustrated in the accompanying drawings, in which:—

Fig. 2 is a section on the line 2—2 of Fig. 3, looking in the direction of the arrow;

Fig. 3 is a section on the line 3—3 of Fig. 1, looking in the direction of the arrow;

Fig. 4 is a section on the line 4—4 of Fig. 3, looking in the direction of the arrow and illustrating our preferred form of retaining and shifting device;

Fig. 5 is a section on the line 5—5 of Fig. 3, showing the supporting bracket for the initial shifting and retaining devices;

Fig. 6 is a section on the line 6—6 of Fig. 1, illustrating the feeding and delivery devices;

Fig. 7 is a section on the line 7—7 of Fig. 2, illustrating our improved electro-magnetic plate-shifting rollers;

Fig. 8 is an enlarged section on the line 8—8 of Fig. 7, showing the top of the drying carrier and the shifting device mounted thereat;

Fig. 9 is a section on the line 9—9 of Fig. 8, illustrating a connection between the electric source of supply and the magnetic rollers;

Fig. 10 is a section on the line 10—10 of Fig. 1, showing in section the operating dog and the magnetic means for throwing it out of mesh to stop the operation of the plate-carrier;

Fig. 11 is a diagrammatic view of the electric devices and connections for operating the magnetic rollers and for automatically stopping the operation of the carrier in the event of displacement of a plate; and Fig. 12 is a view, partly in section, on the line 12—12 of Fig. 6 and partly diagrammatic of the lower drive chains and sprockets.

Figure 1:
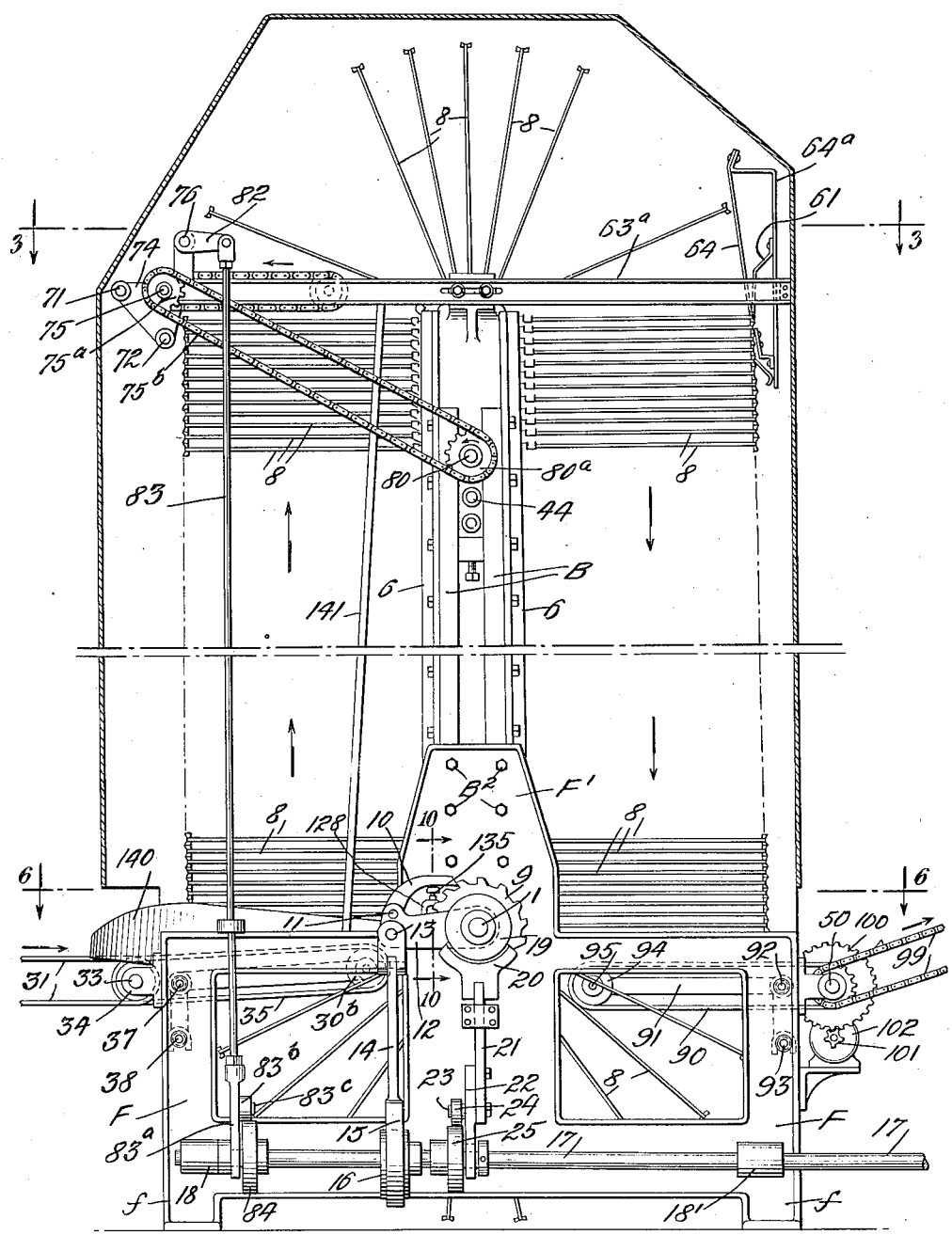
Fig. 1 is a side elevation of an apparatus embodying our invention showing the outer casing in section.

Referring now to these drawings, our invention is shown as applied to a plate-drying apparatus which is the subject-matter of our pending application, Serial No. 56,120, filed on the 14th day of September, 1925, of which this application is a division. The elements of this plate-drying apparatus are as follows:

Conveyor mechanism

A pair of endless conveyor chains C, C' are mounted to extend vertically, the members of a pair being arranged in horizontally-spaced relationship to each other. Each of said pair of chains C, C' are continuous and are mounted at their lower ends on sprockets S, S' on a centrally-located shaft 1 supported, as shown, in a pair of spaced oppositely-arranged frame castings F supported by feet $f$ resting on the floor. As illustrated, each of these frame castings F have centrally-located vertical-extensions F' to each of which are connected, by bolts $b$, a pair of vertically-extending angle-bars B, B', the upper ends of opposite pairs of which bars adjustably support tracks T, T' on which the upper ends of the continuous chains C, C' are mounted and guided, said chains thus having arcuate portions at their upper and lower ends and rectilinear vertically-disposed ascending and descending stretches which preferably incline or taper from the lower mounting toward the upper mounting to compensate for any sagging in the lifting or carrying of their loads as hereinafter specified.

As illustrated, the lower end of the chains are mounted upon the sprockets S, S' which are fast upon the centrally-located shaft 1 journalled in bearings $1^a$ integrally cast in the frame. The opposite ends of the chains are mounted and guided to pass over the grooved support or track T, T' formed in castings 2, 2' adjustably supported on the upper ends of the angle-bars B, B'. As illustrated, the castings 2, 2' are mounted in openings in plates 3, 3' fastened to the upper ends of the angle-bars B, B', the said castings 2, 2' being clamped to the plates 3, 3' by the use of outer plates or castings 4, 4' by clamping-bolts 5.

As illustrated, the chains C, C' comprise a series of links $c$ connecting pivot pins $c^1$ on which are mounted spools or rollers $c^2$ and on their vertical ascending and descending stretches the rollers $c^2$ are guided within tracks formed by fastening a track-strip $B^2$ to each of the angle-bars B, B' and applying at the outer side thereof a U-shaped bar 6 having a track portion, spaced from the track-strip $B^2$ to form a groove and contacting with the rollers at the side opposite to said strip. Each link of the chain has an outward extension comprising a bracket-plate on a pair of which bracket plates a channel bar 7 is supported to extend transversely between the pair of chains C, C'.

The plate holders

Each of these channel bars 7 has mounted thereon a sectional plate holder 8 composed of a plurality of sections $8^a$ spaced from each other to provide plate-handling channels $8^b$.

In the embodiment shown, each plate holder comprises four sections $8^a$ each formed of single wire bent between its ends to form a plate supporting part and passing at their inner attaching ends through both flanges of the channel bar. The inner ends have heads $8^c$ riveted at one side of the inner flange and have a bend $8^d$ at the opposite side of the other flange so as to be firmly supported by such channel bars. These sectional plate-carriers are thus free at their outer ends and are provided with spacing thimbles $8^e$.

It will be apparent that when plate-carriers are thus mounted upon a conveyor chain, they will extend horizontally on the ascending and descending stretches of the chains and that plates to be dried may be supported in horizontal position upon such ascending and descending stretches, thus avoiding any "running" of the coating material during such vertical movement. Both the ascending and descending stretches are, as aforesaid, preferably guided in a slightly inclined or conical path so as to compensate for any normal sagging of the plate holders.

The driving mechanism

These chains C, C' are preferably driven with an intermittent motion for a purpose to be hereinafter more particularly specified. As illustrated, a ratchet wheel 9 is fast upon the shaft 1 and is intermittently moved by a dog or pawl 10 having its free end engaging the teeth of the said ratchet wheel 9 and being, as illustrated, pivoted at 11 at the outer end of an arm 12 pivotally mounted upon the said shaft 1. The said pivoted arm 12 is engaged at its outer end by a pivoted link 13 which is in turn pivoted to an operating rod 14 connected to a cam strap 15 operatively mounted upon a grooved cam disc 16 upon a power shaft 17 driven from any suitable source of power not shown and mounted in bearings 18, 18' on the frame F. It will be apparent that upon rotation of the power shaft 17 and cam disc 16 the connecting rod will be moved intermittently which in turn will rock the pawl or dog about the shaft 1 and cause the shaft 1 to be rotated by an intermittent movement, each tooth in the ratchet corresponding to a step in such intermittent movement. It is desirable to prevent any excessive or slipping movement of the said shaft 1, and for this purpose, we mount, in cooperation with the pawl, a braking device comprising a disc or wheel 19 fixed on the same shaft 1 which is braked by a braking shoe 20 having a lined braking surface engaging the same and operated into braking relationship simultaneously with the completion of each step in the intermittent movement by means of an arm 21 adjustably fastened upon a bifurcated arm 22 engaging the shaft 17 and carrying on a stub shaft 23 a roller 24 engaging a cam wheel 25 fixed on the power shaft 17. The cams 16 and 25 are arranged to time the braking action of the shoe so as to stop any excessive or slipping movement of the ratchet wheel and shaft.

The feeding mechanism

The movement of the chains and sectional plate-carriers about an arcuate guide such as the sprockets S, S' at the lower ends, causes the opening-up or spacing of the plate-carriers 8 and we provide just below the beginning of the ascending stretch of the chain, a feeding mechanism.

This feeding mechanism may be driven from any suitable source of power and, as illustrated, comprises a series of three bracket arms 30 each mounted at one end adjacent to the outer end of the plate-carriers and having its free end extending or projecting inwardly into the spaces or channels 8$^b$ between the sectional plate-carriers 8, thus permitting a plate P to be moved thereon into the path of the plate-carriers and into the normal elevating position of such plates on the carriers, thus to avoid any shifting of the plates after engagement thereof by the said sectional plate-carriers 8.

It will be seen that the projection of these feeding arms into the channels between the sections of the plate-carriers, in effect, produce an interlacing relationship therebetween; that the arms lie in planes parallel with the plate-carrier sections and extend into juxtaposition with each other. As illustrated, the plates are fed on to the carriers by supporting the same upon a series of belts 31 mounted on suitable pulleys (not shown) at one end, at the opposite end upon pulleys 32 fixed on a shaft 33 journalled in bearing brackets 34 on the side of a frame and when the plate is carried forwardly, the under surface thereof is engaged by belts 35 supported at one end upon pulleys 36 also fixed upon the shaft 33 and supported at their opposite ends upon pulleys 30$^b$ mounted on stub shafts 30$^a$ at free ends of the bell-crank arms 30 which are rigidly supported upon rods 37 and 38 so as to hold the outer pulley-supporting free end of the arm firmly in position within the spaces or channels between said plate-carrier sections.

From the above, it will be obvious that a plate fed to the outer belts will be carried into the path of the plate-carriers just before the closing up for the ascending stretch thereof; that the plate will thus be supported in substantially horizontal position so that wet paint or a coating of any kind may be dried without any marring thereof by engagement of the plate-carriers with the upper wet face thereof and without any "running" of the paint or other material.

*The transfer mechanism*

In accordance with our present invention, we provide means not only to carry the plates in horizontal position on the ascending stretch, but also to carry such plates on the downward or descending stretch of this chain with the same surface of the plate uppermost as it is apparent that if a plate were allowed to turn or swing around with the chain and plate-carriers, they would first be turned edgewise and then turned over. To avoid this and to continue the drying on the downward stretch, we provide at the upper end of the conveyor mechanism a novel form of transfer mechanism embodying magnetic rollers for shifting the plate from the upper end of the ascending stretch to the beginning of the descending stretch and this shifting is accomplished between the end and beginning respectively of these stretches and the turning portion of the chains.

In order to provide space for the operation of the shifting mechanism, we preferably cause the chains at the upper end to be first guided in a sharp curve between the vertically-disposed ascending portion and the beginning of the arcuate portion and we also provide a similar sharp guiding curve between said arcuate portion and the beginning of the descending stretch, thus causing an enlargement of the normal spacing or separation between the plate-carriers to facilitate the shifting of a plate edgewise or horizontally from the end of the ascending stretch to the beginning of the descending stretch.

*The magnetic rollers*

In the preferred embodiment shown, this shifting is accomplished by mounting at the upper end of the conveyor between the ascending and descending stretches of chain and carriers of self-attaching or self-attracting means, preferably comprising magnetic rollers R for engaging the lower surfaces of the plates P and shifting the same edgewise laterally preferably in combination with means for initially shifting the plates into contact with said magnetic shifting rollers. As illustrated, these shifting devices comprise a pair of magnetic rollers R each mounted on a shaft 40 in bearing blocks 41, 41$^a$ on the track castings T, T' just below the said guiding tracks and, as illustrated, these magnetic rollers (see Figs. 3 and 7) are actuated to rotate in the same direction by providing on each of the shafts, sprockets 42 which are commonly or mutually engaged by a sprocket chain 43 which is driven from a shaft 44 having a sprocket 45 fixed thereon, over which the opposite end of the chain 43 passes. This shaft 44 has a sprocket 46 fast thereon and is in turn, driven through the chain 47 and sprocket 48 on a shaft 49 which is geared or connected by a series of sprockets and chains with a drive-shaft 50 at the delivery end of the machine.

In said preferred form illustrated, a non-magnetic idler roller r is preferably mounted between the magnetic rollers on a shaft 51 supported in a bearing bracket 52, 52' and is rotated by engagement of a sprocket 53 with the actuating chain for the magnetic roller. Each roller is provided with annular collars 54 having peripheral surfaces 55 which are magnetized by windings or coils 56. Electric energy is supplied to said rollers R by providing at one end thereof an insulated circular track 57 with which a contact brush 58 is supported in a holder 59 connected to the track casting T'. The brushes 58 are connected by wires 60 to one pole of the generator, and the magnetic windings or coils 56 of the rollers are suitably grounded on the shaft which is connected, as represented in the diagrammatic view in Fig. 11 by the line 40$^a$ and which is in turn connected to the ground wire 40$^b$ of the generator. The magnetic rollers, as shown, are each provided with a series of magnetic collars having peripheral contact surfaces and a series of coils are arranged between and electrically connected with such collars. It will be obvious, therefore, that when these magnetic collars are energized, they will attract, grip and hold the under or lower surface of a metal plate and that when the roller is, during such magnetic attraction, rotated, as aforesaid, it will cause the plate to be shifted edgewise laterally; that contact of the edge of the plate with one of the rollers will thus cause an edgewise shifting over that roller and into contact with the second roller which will continue to shift the same edgewise or laterally on to a plate-carrier on the descending stretch of the conveyor chain.

In a shifting device of this type, we find that the momentum of a plate during movement over the rollers causes it to be shifted or slid beyond the surface of the last roller and on the plate-carriers on the descending stretch of the conveyor chains.

In the said preferred embodiment, we preferably provide a series of buffer bars preferably comprising two spring buffer bars 61, 61$^a$ mounted upon the bracket bar 62 supported upon cross bars 63, 63$^a$ forming a portion of the upper end of the machine, and between these two buffer bars 61, 61$^a$ we preferably provide another flexible spring buffer bar 64 connected at opposite ends in an inclined position on a similar bracket bar 64$^a$ also supported upon said cross bar.

Our preferred means for initially shifting the plate into engagement with the magnetic rollers comprises a series of bracket arms 70 (see Fig. 3) extending within the spaces 8$^b$ between the sectional plate-carriers 8$^a$ which arms are securely fastened at the outer ends at two points on the bars 71 and 72 mounted adjacent to the outer ends of the plate-carriers in brackets 73 and 74 fastened to the cross bar 63$^a$ and have sprockets 70$^a$ on stub shafts 70$^b$ at the free ends which extend to a point adjacent to the rollers R. The brackets have journalled at opposite ends thereof two shafts 75 and 76. On the shaft 75 are journalled sprockets 77 each having mounted thereon one end of a chain 78, the opposite end of which passes over a sprocket 70$^a$. Each chain preferably is provided with a tooth or projection 79 adapted in each revolution to engage the side edge of the plate and to move or slide it edgewise into contact with the magnetic rollers. The said shaft 75 is driven continuously and timed by a connection to the shaft 80. As shown, the shaft 75 is provided with a sprocket 75$^a$ meshing with a chain 75$^b$ which engages a sprocket 80$^a$ on the shaft 80 which is geared by gears 80$^b$, 80$^c$ to the shaft 44 from which the magnetic gears are rotated and which in turn is connected to the power shaft at the delivery side of the machine.

The plates P after being shifted to the descending stretch or flight of plate-carriers, are carried downwardly until they engage and are supported upon delivery belts 90 similarly extending within the channels or spaces 8$^b$ between the sectional plate holders 8$^a$. These delivery belts are supported upon bell-crank bracket arms 91 mounted at the outer edge of the machine on rods 92 and 93. The inner ends of the delivery belts 90 are each mounted upon a pulley 94 journalled upon a stub shaft 95 supported on the bracket arm 91 while the opposite outer end is mounted on pulleys 96 on a drive shaft 50 mounted in bearings 98 at opposite side edges of the frame casting F of the machine. On this shaft 50 is also supported transfer pulleys 98 having chains 99 for movement of the plates outside of the machine, which chain is preferably provided with projections for engaging the edges of the plate and in the preferred embodiment of the machine shown, said chain is connected with any suitable source of power not shown to supply power for driving the shaft 50.

On the shaft 50 is provided a large gear 100 which meshes with a pinion 101 to rotate the shaft of a generator 102 which furnishes energy to the magnetic rollers R and to the magnet for the stop mechanism hereinafter specified. Said shaft 50 is also provided with a sprocket 103 which through the chain 104 and sprocket 105 transmits power to the shaft 33 at the feeding side of the machine for the purpose of rotating the feed belts 31 which have heretofore been described.

Said shaft 50 also has mounted thereon a sprocket 106 which through the chain 107 drives a sprocket 108 on a stub shaft 109 on which shaft is mounted sprocket 110 driving through a chain 111 passing over a sprocket 112 on the stub shaft 49 on which stub shaft is mounted the sprocket 48 which drives the chain 47 engaging the sprocket 46 on the shaft 44 from which the magnetic rollers and other devices hereinabove specified are driven.

*The automatic stopping mechanism*

We preferably provide means for automatically stopping the machine in the event of the fouling or displacement of a plate during the transfer or shifting thereof or in the event of the shifting means failing to operate. For this purpose, we preferably mount over the magnetic rollers R a movable guard plate 120 preferably pivoted at one end by pivot 121 in bearings 122 suitably supported on the bearing bracket for the magnetic roller and being free at its opposite ends 120ª so as to be engaged and moved in the event of the failure of the transfer or shifting mechanism to operate and thus to cause the plate-carriers to move a plate into engagement therewith or in case any other part of the mechanism fails to properly move a plate in proper position. When the end 120ª of the guard plate is so engaged by one of the plates P to be dried, it will be lifted and will engage a spring-pressed roller 123 which is mounted upon a pin 124 movable vertically in a bracket 125 and the end of this pin 124 upon movement thereof will compress the spring 126 and will engage one of the contacts of a switch 127 which will close the circuit and energize a magnet 128 (see Figs. 10 and 11) the armature 129 of which is pivotally mounted on a pivot 130 and has at its end a cushioning device comprising a plunger bar 131 having a spring 132 abutting between a base 133 on the armature and a pin 134 through the shank thereof. When so energized, the pivoted armature will be rocked about its pivot and an extension 135 thereof at the opposite side of the pivot will be caused to engage the dog or pawl 10 to lift the same out of engagement with the ratchet wheel 9 so as to prevent further intermittent rotation. The extension 135 will be held in elevated position with the dog 10 out of engagement by means of a spring-pressed arm 136 pivoted at 136ª on the magnet 128 and having a notch 136ᵇ adapted to engage a projection or pin 137 on said extension 135.

The armature 129 is normally held in elevated position by means of a spring 138 stretched between said extension 135 and a projection 139 on the core of the magnet. The cushioning plunger 131 on the armature provides a flexible means for disengaging the dog so that the operation of the stopping magnet which is likely to happen at any time will, in the event of being unable to release the dog because of its engaging position, tension the spring 132 which will thus release the said dog so soon as it reaches a position when it can be released. It will be understood that the dog when in engagement with the ratchet and in its operating movement, cannot be lifted, and in order to free the ratchet from the pawl it is necessary to wait until the pawl starts on its return movement. If, therefore, a plate is being fouled while the pawl is so engaged, the magnet will be energized and the armature will be operated to store the power in the spring 132 which will thereafter lift the dog so soon as it starts on its backward movement.

Suitable horizontally-disposed guide means are provided at the opposite sides of the delivery belts for moving the plates into position on the plate-carriers, and for this purpose we mount curved feed plates 140 at opposite sides of such belts.

We also preferably provide vertical buffer or guide bars 141 at opposite sides of the ascending flight of the carriers for the purpose of maintaining the same in sidewise alignment. As illustrated, we also provide two pairs of vertical guide bars 142 for the inner edges of the plate in case of displacement toward the conveyor chain and magnetic rollers, one pair being arranged to guide plates on the ascending stretch and the other pair to guide on the descending stretch. These bars 142, as illustrated, are mounted at their lower ends on projecting lugs 142ª fastened to cross bars 143 which are connected at their opposite ends to angle frame bars. The upper ends of the pairs of guide bars 142 preferably rest upon or are arranged closely adjacent to the peripheries of the magnetic rollers so as to act as guards against contact of the edges of the plate therewith before reaching the upper end of the flight.

Having described our invention, we claim:—

1. Apparatus for handling wet plates, embodying, in combination, plate-carrying mechanism having members mounted to move in spaced paths, a roller having on its periphery means for attracting a plate upon contact therewith, and means for rotating said roller to cause the plate to be shifted over the roller upon such rotation from a member moving in one of said paths to a member moving in the other of said paths.

2. Apparatus for handling wet plates, embodying, in combination, plate-carrying mechanism having members mounted to move in spaced paths, a roller having a peripheral surface carrying a magnetic charge, and means for rotating said roller whereby the bottom surface of a metal plate contacting with said roller will be attracted upon contact with the roller and will be shifted over said roller upon rotation thereof from a member moving in one of said paths to a member moving in the other of said paths.

3. Apparatus for handling wet plates, embodying, in combination, plate-carrying mechanism having members mounted to move in spaced paths, a roller having a peripheral surface carrying an electro-magnetic charge, and means for rotating said roller whereby the bottom surface of a metal plate contacting with said roller will be attracted upon contact with the roller and will be shifted over said roller upon rotation thereof from a member moving in one of said paths to a member moving in the other of said paths.

4. Apparatus for handling wet plates, embodying, in combination, plate-carrying mechanism having members mounted to move in spaced paths, a plurality of electro-magnetic rollers having charged peripheral surfaces, and means for rotating said charged rollers to cause a plate moved into contact with one roller to be moved thereby into contact with the other roller and then to be continuously shifted over said second magnetic-roller by the rotation thereof from a member moving in one of said paths to a member moving in the other of said paths.

5. Apparatus for handling wet plates, embodying, in combination, plate-carrying mechanism having members mounted to move in spaced paths, a plurality of electro-magnetic rollers having charged peripheral surfaces and an idler roller arranged between such rollers, and means for rotating said charged rollers to cause a plate to be moved by one roller, then over said idler and into contact with the other, and then to be continuously shifted over said second magnetic-roller from a member moving in one of said paths to a member moving in the other of said paths.

6. Apparatus for handling wet plates, embodying, in combination, plate-carrying mechanism having members mounted to move in spaced paths, a plurality of electro-magnetic rollers having charged peripheral surfaces and an idler roller arranged between such rollers, and means for rotating said charged rollers to cause a plate to be moved by one roller, then over said idler and into contact with the other, and then to be continuously shifted over said second magnetic-roller from a member moving in one of said paths to a member moving in the other of said paths, and means for initially moving a plate into contact with said electro-magnetic rollers.

In witness whereof, we have signed our names to the foregoing specification.

CHARLES WAGNER.
AUGUST HORMEL.